THOMAS H. OSTER
INVENTOR

United States Patent Office 3,192,898
Patented July 6, 1965

3,192,898
LIMNOLOGICAL PROCESS
Thomas H. Oster, 156 S. Franklin St., Dearborn, Mich.
Filed Feb. 5, 1962, Ser. No. 171,130
10 Claims. (Cl. 119—3)

This invention lies in the general field of limnology. It is particularly concerned with processes for the manipulation of lakes and streams to render these water resources more useful than would be the case in their natural state. This invention relates to a process for mitigating the adverse effects of heavy ice cover on bodies of water in the cold season. This invention further relates to a system for rendering bodies of water including very large bodies of water uniform in temperature and chemical composition. This invention is also concerned with an improved system for retarding the loss of moisture from bodies of water by evaporation.

This invention is best understood by reference to the drawings in which.

The combined heavy cover of snow and ice which covers many lakes and streams in our more rigorous climates has many detrimental effects upon the usefulness of such bodies of water. The combined snow and ice cover is opaque to sunlight. In the absence of sunlight the underwater vegetation dies and then decomposes. This decomposition depletes the oxygen supply naturally present in the lake to a point where it can no longer support fish life. The more valuable species of fish such as bass and pike are the first to expire leaving as survivors bull-heads and other so called trash fish. This phenomenon is known as "winter kill." A severe winter kill can virtually ruin a lake insofar as useful fishing is concerned.

Figure 1:
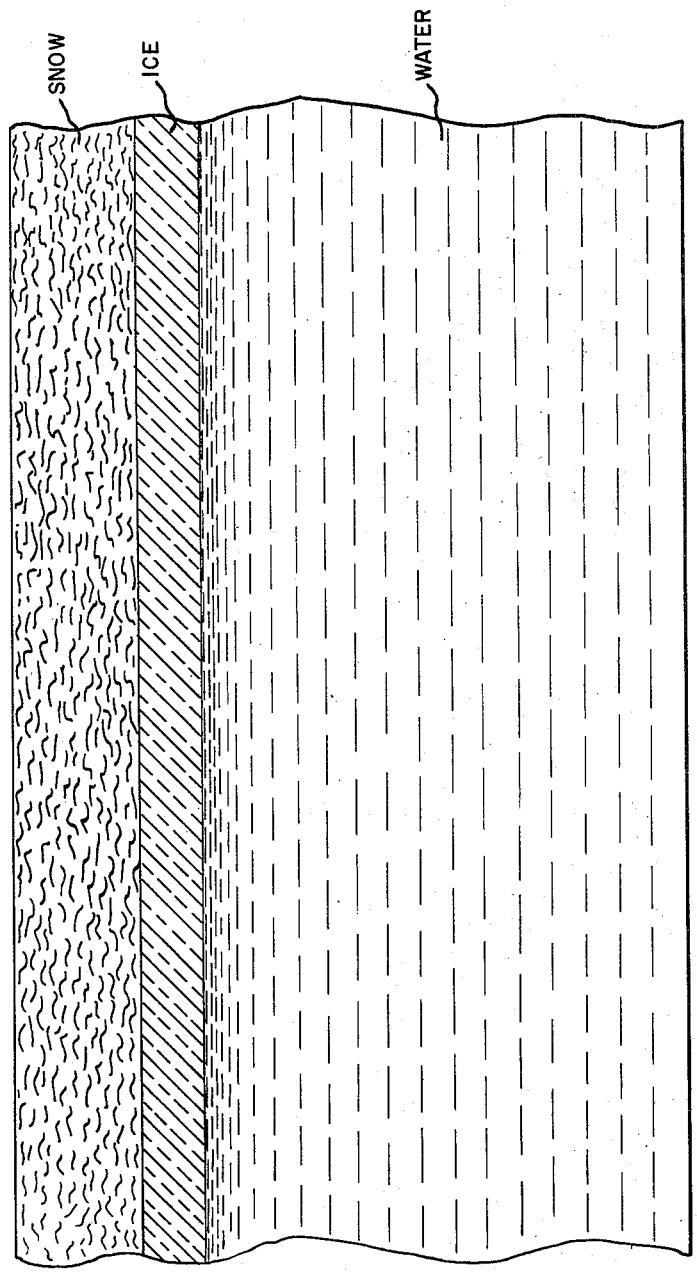
FIGURE 1 is a cross section through a normal undisturbed lake showing a covering of ice supporting a layer of snow.
Figure 2:
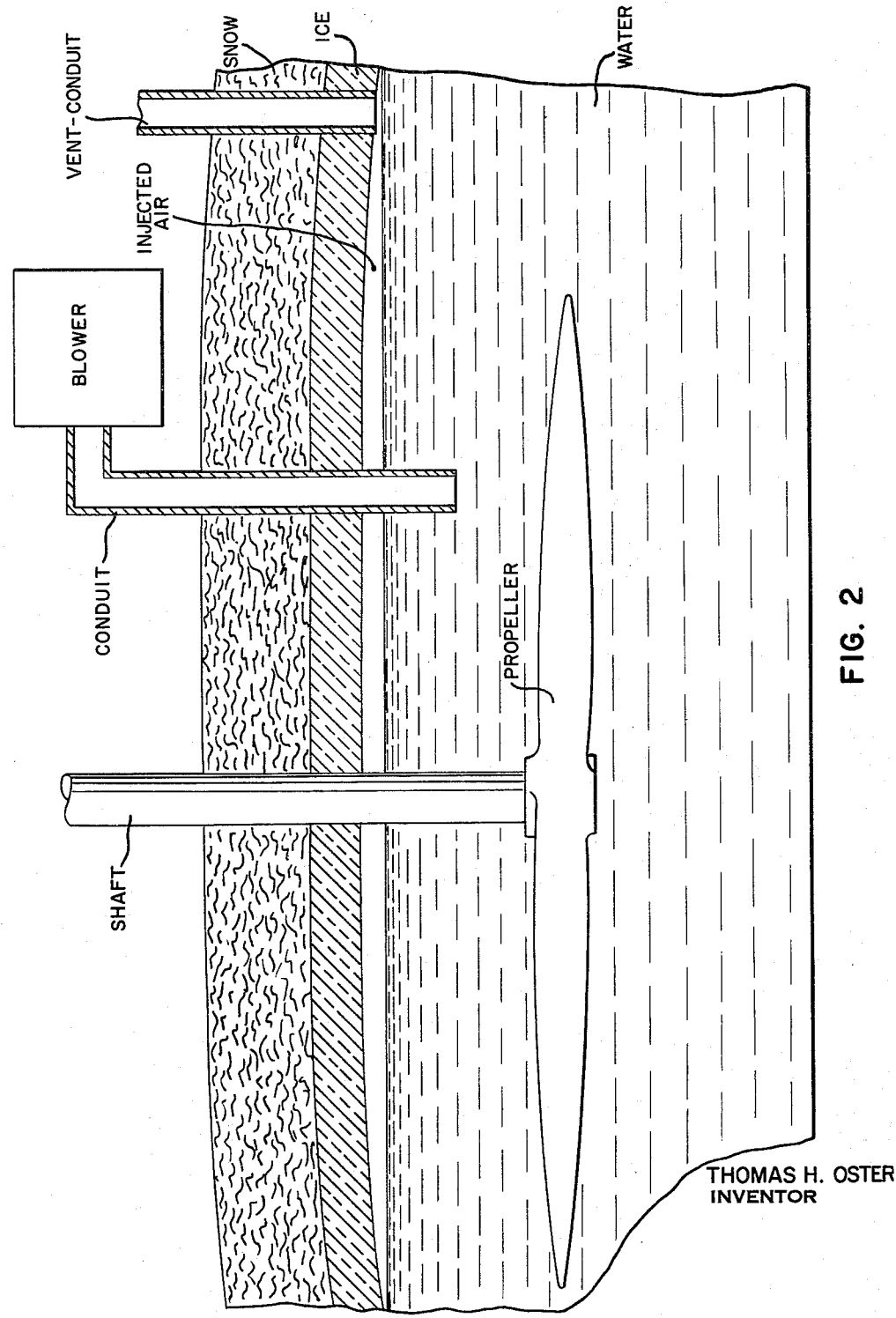
FIGURE 2 is a showing of a similar body of water with the combined snow and ice covering, but modified according to the teachings of this invention.

A cross section of a lake in its natural condition in mid-winter and early spring is shown in FIGURE 1. It is thought that this drawing is self-explanatory. FIGURE 2 shows this same lake in the frozen condition shown in FIGURE 1 but modified according to this invention. This drawing shows a conduit inserted into an opening through the snow and ice and extended a slight distance into the underlaying water. This conduit is connected to a low pressure high volume blower, preferably of the centrifugal type. This low pressure high volume blower forces air through the conduit and into the space between the ice and the water. As air continues to flow into this space, the ice sheet in the vicinity of the conduit is deformed into the shape of an inverted catenary. This injected air flows radially away from the conduit in the form of a thin layer interposed between the ice and the water. This flowing thin layer of air makes an excellent device for dissolving air in the subnatant air deficient water.

At first blush it would appear that even a small lake would require a large blower and heavy expense for power to have any appreciable effect. This is not so. A conventional tank type vacuum cleaner used as a blower can produce a pressure of one half pound per square inch. This easily capable of lifting a six inch ice cover over a large area. The ice flows under this upward thrust as would a very viscous liquid. A blower capable of producing a pressure of one and one half to two pounds per square inch can handle practically any ice-snow combination likely to be encountered. If it is desired to limit or localize the separation between the ice and the water, a vent can be supplied as shown in FIGURE 2 to permit the escape of the injected air.

The presence of a layer of air between the ice and the water serves the additional purpose of retarding the further formation of ice in the lake. This layer of air serves as an insulator to prevent heat from flowing from the warmer water to the ice layer.

In areas of heavy snow fall, the weight of snow upon the ice forces the ice down into the lake water and forces the water up through any naturally existing openings. This water mixes with the snow and produces a layer of slush which renders travel over such lakes difficult and hazardous. A layer of air separating the ice and the subnatent water will support the ice and snow and prevent such mixing.

The effectiveness of the replacement of dissolved air in the lake can be greatly enhanced by judicious circulation of a substantial portion of the mass of the lake past the layer of air entrapped between the ice and the water. The solution of air in water tends to lower the density of the water and to produce stratification with the air rich layer at the surface. This tendency to stratify is superimposed upon the thermal stratification due to the presence of a maximum density in water at four degrees centigrade. The circulation necessary to avoid this stratification can be economically obtained by the use of propellers of large diameter revolving at a very low speed. These propellers can be oriented to thrust the water either upwards, downwards or at any intermediate direction. An upward thrust is normally desired. The rotational speed and diameter and hence the peripheral speed of these propellers are chosen so that these propellers present no particular hazard to fish or even human beings who may come into their path.

A typical lake to which this invention may apply may be assumed to have a surface area of 1,000 acres and an average depth of 10 feet. This lake will contain 4.356 x $10^8$ cubic feet of water. The propeller comprises two blades 12 feet long mounted upon a shaft and rotated at a tip speed of 10 feet per second. These blades are contoured to impart to the water a maximum axial speed of one foot per second. This propeller will require about one horsepower to drive it and will pass the entire volume of the lake approximately once every two weeks. It is essential that the axial speed of the water induced by the propeller be kept as low as possible. The typical velocity of one foot per second is not critical except as to power consumption. In many cases even this very low velocity may be further decreased, and in certain circumstances it may be increased. It should be borne in mind that the power requirements of any such propeller increase as the cube of the velocity imparted to the water. Undesired turbulence in the lake and unnecessary hazards to both fish and human life result from propeller tip speeds which even approach usual engineering values. Axial speeds of water in excess of four feet per second are not feasible in moving very large bodies of water because of exorbitant power consumption and the hazards mentioned supra in connection with high propeller tip speeds.

In designing an installation of this type care should be taken to provide ample space both above and below the propeller to permit the moving water to escape radially without exceeding the axial velocity imparted to it by the propeller. The propeller given by way of example will move approximately 600 cubic feet of water each second at a velocity of one foot per second. The circumference of the circle swept out by the propeller is approximately 75 feet. Accordingly, the propeller should be no closer than approximately eight feet to either the water surface or the lake bottom. Eight is approximately the quotient obtained by dividing the volume of water displaced per second by the circumference of the circle swept out by the propeller.

Low speed high volume propellers may be employed with advantage in conjunction with the teachings of my United States Letters Patent 2,991,622, issued July 11, 1961. By the use of these low speed high volume propellers the processes taught in that patent may be applied to very large masses of water for the inhibition of evaporation losses as well as the prevention of ice formation. In deep bodies of water it is only necessary to impart sufficient axial velocity to the column of water to barely overcome the well-known thermal stratification. A simple order of magnitude calculation will show that approximately one hundred horse power judiciously applied to move water at not over one foot per second is capable of circulating annually a mass of water greater than the entire twenty-nine million acre feet impounded in Lake Mead.

Our Great Lakes contain approximately five thousand cubic miles of water and have heretofore been considered beyond human manipulation. However, simple calculation will demonstrate that the relatively moderate power of fifty thousand kilowatts applied at and divided among judiciously chosen locations is capable of imparting to the entire mass of the Great Lakes a velocity of about one foot per second per annum. Such a velocity applied vertically could destratify this large mass of water with very beneficial effects upon the Great Lakes and the surrounding territory.

I claim as my invention:

1. A process for inhibiting winter kill in an at least partially frozen lake comprising injecting a large volume of air at a pressure not exceeding two pounds per square inch into the water adjacent the lower surface of the ice layer whereby the ice layer is lifted pneumatically and separated vertically from the underlaying portion of the lake over a substantial area.

2. A process for inhibiting winter kill in an at least partially frozen lake comprising injecting a large volume of air at a pressure not exceeding two pounds per square inch into the water adjacent the lower surface of ice layer whereby the ice layer is lifted pneumatically and separated vertically from the underlaying portion of the lake over a substantial area and permitting the air so injected to flow freely radially and escape at a location other than the location at which it was injected.

3. A process for limiting the thickness of the ice covering produced upon a lake during the winter season comprising permitting a layer of ice of predetermined minimum thickness to at least partially cover the surface of the lake, injecting a large volume of air at a pressure not exceeding two pounds per square inch into the water adjacent the lower surface of the ice layer whereby the ice layer is lifted pneumatically and separated vertically from the underlaying portion of the lake over a substantial area.

4. A process for limiting the thickness of the ice covering produced upon a lake during the winter season comprising permitting a layer of ice of predetermined minimum thickness to at least partially cover the surface of the lake, injecting a large volume of air at a pressure not exceeding two pounds per square inch into the water adjacent the lower surface of the ice layer whereby the ice layer is lifted pneumatically and separated vertically from the underlaying portion of the lake over a substantial area and permitting in the air so injected to flow freely radially and escape at a location other than at the location at which it was injected.

5. A process for altering the limnology of an at least partially frozen body of water comprising injecting a large volume of air at a pressure of not over two pounds per square inch adjacent the ice water interface whereby the ice and water are pneumatically separated over a substantial area.

6. A process for altering the limnology of an at least partially frozen body of water comprising injecting a large volume of air at a pressure of not over two pounds per square inch adjacent the ice water interface whereby the ice and water are pneumatically separated over a substantial area and permitting the air so injected to flow radially and escape at a location other than the location at which it was injected.

7. A process for altering the limnology of an at least partially frozen body of water comprising injecting a large volume of air at a pressure of not over two pounds per square inch adjacent the ice water interface whereby the ice and water are pneumatically separated over a substantial area and imparting to a portion of the body of water by means of a submerged propeller a movement not in excess of four feet per second and having a vertical component whereby large volumes of water are brought into contact with the injected air.

8. A process for altering the limnology of a large body of water comprising submerging an open propeller in said body of water to a stationary position and by means of such propeller imparting to large volumes of water motion having a vertical component and a velocity not in excess of four feet per second while said propeller is maintained at said stationary position.

9. A process for altering the limnology of a large body of water comprising submerging an open propeller in said body of water to a stationary position and by means of such propeller imparting to large volumes of water motion having a vertical component and a velocity of approximately one foot per second while said propeller is maintained at said stationary position.

10. The process of altering the limnology of a large body of water comprising submerging an open propeller in said body of water and by means of such propeller imparting to a large volume of water a velocity of not in excess of four feet per second, said propeller being located a minimum distance from the surface and bottom of the body of water, said minimum distance in feet being approximately the quotient obtained by dividing the volume of water displaced expressed as cubic feet per second by the product of the circumference in feet swept out by the propeller and the velocity of the water in feet per second.

References Cited by the Examiner

UNITED STATES PATENTS

| 1,375,168 | 4/21 | Nielsen | 259—1 |
| 1,462,485 | 7/23 | Denison | 259—1 |
| 2,116,023 | 5/38 | Gwidt | 261—87 |
| 2,187,746 | 1/40 | Lefevre | 261—87 |
| 2,255,532 | 9/41 | Rank | 261—121 |
| 2,417,519 | 3/47 | Persson et al. | 261—87 |
| 2,684,838 | 7/54 | Rush | 261—121 |
| 3,109,288 | 11/63 | Gross | 61—1 |

FOREIGN PATENTS

| 1,237,407 | 6/60 | France. |

SAMUEL KOREN, *Primary Examiner.*

JACOB SHAPIRO, ALDRICH F. MEDBERY,
*Examiners.*